Patented Oct. 30, 1945

2,388,166

UNITED STATES PATENT OFFICE 2,388,166

COMPOSITION COMPRISING AN ORGANO-LITHIUM PRODUCT

William F. Luckenbach, Jr., Oaklyn, N. J., assignor to Foote Mineral Company, Philadelphia, Pa., a corporation of Pennsylvania No Drawing. Application July 3, 1942, Serial No. 449,693

18 Claims. (Cl. 106—268)

My invention has as its object the production of new and unique coating agents. More specifically, I have discovered that lithium organic salts, properly treated, are valuable wax-like coating agents useful in a much wider range of application than materials heretofore known.

The prior art discloses the use of waxes such as carnauba, montan, beeswax, candelilla, paraffin, etc., for numerous coating applications. Synthetic materials such as hydrogenated organic esters, chlorinated waxes, carbo waxes and other similar materials have been disclosed as useful for a great number of coating applications. Metallic soaps, such as calcium and aluminum fatty acid reaction products have been proposed as bulking agents, fillers, additives and flatting agents in coating compositions.

U. S. Patent No. 2,010,297 recites the use of calcium stearate in combination with beeswax, ceresin and other waxes, but the value of this metal soap is as a pour point depressor to which I make no claims for my invention. In U. S. Patent No. 2,066,296 zinc stearate is employed together with paraffin wax and drying oils as a floor finish. Here the zinc stearate is used to supply oxygen, thus accelerating the drying of the oils used in the coatings. Hubert Deguide was granted U. S. Patent No. 2,126,096 covering the use of barium stearate as a stabilizing agent in certain wax solvent mixtures. The disclosures of this patent are in no way pertinent to my invention, since the products discussed are in dissimilar chemical classifications.

I have discovered that by heat treating lithium organic salts; alone, in the presence of other waxes or solvents, or in the presence of waxes and solvents; at a temperature above about 150° C. and below the decomposition point until fusion and substantial lowering of the viscosity is achieved, that a wax possessing new and highly desirable properties results.

In carrying out my invention lithium salts of mono or poly basic aliphatic carboxylic acids containing at least eight carbon atoms, for example caprylic, capric, lauric, myristic, stearic, palmitic, oleic, linoleic, ricinoleic, heptadecanoic, arachidic, sylvic and sebacic acids, may be employed with excellent results. Lithium salts of mono or poly basic aromatic acids as well as the lithium salts of aryl alkyl mono or poly basic acids, such as ethyl benzoic, isopropyl salicylic, diisobutyl ethyl salicylic and naphthoic containing at least eight carbon atoms also give excellent results when treated in accordance with my above defined procedure. The lithium salts of ether, amino, hydroxy and halogenated acids, a few examples of which are capryl oxy acetic acid, diisobutyl oxy acetic acid, dihydroxy stearic, caseinogen, dibromo eladic acid, etc., containing a minimum of eight carbon atoms produce satisfactory coating materials when treated as described. Branch chain and unsaturated as well as saturated and straight chain acids of at least eight carbon atoms, when converted to their lithium salts and treated as described, all produce coating materials.

It will be recognized that most commercially available acids such as stearic, oleic, linoleic, etc., are not pure compounds but mixtures of a number of acids. Commercial stearic acid often contains some palmitic, oleic, lauric and myristic acids in addition to its stearic content. It is then obvious that in referring to the lithium salts of these acids, mixtures rather than pure chemical compounds are to be considered. Naturally the properties, as for example, melting point, water solubility, etc., of the compounds referred to in this specification vary and thus by mixing certain of these lithium salts and then heat treating as described, the properties of the resulting products can be widely altered. In the same manner by varying the lithium salt, wax and solvent used when processing in accordance with this disclosure, innumerable combinations can be obtained having different properties. I can, by combining high percentages of lithium stearate with carnauba wax, produce a very high melting point solid which is quite hard and brittle. By lowering the content of lithium stearate, a wax with a slightly lower melting point and having a hard but tough texture results. By substituting other waxes, for example, beeswax and paraffin, for the carnauba, a product with considerable elasticity and cohesive strength results. Still other combinations produce semi-soft, stringy waxes which adhere with great tenacity to surfaces. If in place of lithium stearate, lithium linoleate is used, then wax compositions whose properties alter with aging result. This phenomenon seems to be due to the drying tendencies of the lithium linoleate. Thus within the scope of my invention, it is possible to produce coating compositions ranging from semi-soft, adhesive masses, to very hard, high melting, brittle, cohesive solids, including compositions with intermediate properties such as hornyness, toughness, compressibility and elasticity.

The time and temperature conditions of my heat-treating method are naturally affected by the particular lithium salt chosen, or by the combinations of lithium salt, wax and solvent employed. The percentage of each ingredient (i. e. wax, lithium salt and solvent) in these combinations also has a considerable effect on the time and temperature required to achieve the desired conversion. In general the conversion temperature of a lithium salt, not mixed with a wax, is higher than when a wax is added. Similarly the addition of a solvent further lowers the effective conversion temperature. The lowering of the conversion temperature usually necessitates a longer reaction time if the same results are to be achieved. Furthermore if the time of conversion is increased considerably, it is usually possible to somewhat lower the conversion temperature. It is sometimes possible to carry out this conversion at temperatures considerably below 150° C., and the time of conversion may vary from a few minutes to a number of hours. It is, therefore, quite evident that the conversion described may take place over a wide temperature and time range without departing from the spirit of my invention.

While lower temperatures and longer conversion times will produce satisfactory coating compositions, I prefer to use temperatures sufficiently high to bring about the conversion in a minimum time but not so high as to cause decomposition. To fully clarify and describe my invention, the following examples are given, but I do not wish to be restricted to these examples.

*Example 1.*—100 grams of powdered lithium stearate was heated, out of contact with air, to a temperature of about 225°–235° C. The mass first fused became clear and had a very heavy viscosity. On further heating (about 15 minutes to 25 minutes) the heavy clear paste suddenly lost viscosity and became about like a 10-W motor oil in thickness; then heating was stopped. On cooling, the material formed a hard, tough, waxy, semi-clear mass which produced a high luster when rubbed on a metal or a wood surface.

*Example 2.*—50 grams of lithium stearate (commercial) was heated with 50 grams of beeswax in a manner described in Example 1. Similar changes in physical structure occurred. On cooling a hard semi-clear, somewhat elastic, cohesive wax with a melting point in excess of 180° C. was formed. This product produced a high luster and a water and solvent resistant coating when applied on metal and wood surfaces.

*Example 3.*—The procedure followed in Example 2 was repeated using carnauba, paraffin and beeswax and varying the percentage of lithium stearate in each run. The profound effect of the treatment with lithium stearate is indicated by the melting point composition temperatures shown.

|  | Melting point, °C. | Percent lithium stearate |
|---|---|---|
| Paraffin | 48 | 0 |
|  | 140 | 10 |
|  | 200 | 20 |
|  | 210 | 40 |
|  | 225 | 60 |
|  | 230 | 80 |
| Beeswax | 68 | 0 |
|  | 100 | 10 |
|  | 140 | 20 |
|  | 175 | 40 |
|  | 210 | 60 |
|  | 230 | 80 |
| Carnauba | 78 | 0 |
|  | 140 | 10 |
|  | 180 | 20 |
|  | 195 | 40 |
|  | 210 | 60 |
|  | 218 | 80 |

Any wax or solvent compatible with the lithium salts disclosed may be used and the wax or solvent used is chosen for its special properties in conjunction with the application to be accomplished. Such waxes as carnauba, montan, beeswax, paraffin, candelilla, ceresin, ozokerite and related products serve admirably for many uses. Various synthetic waxes such as chlorinated paraffins, high boiling esters, alcohols and oxidized petroleum compositions may be used if desired. A wide range of solvents may be employed depending on the properties which are desired. If rapid evaporation is required, then a low boiling solvent such as hexane or benzene may be chosen. If slower drying is required, kerosene, gasoline, toluene or turpentine may be used. If the solvent chosen has a boiling point below the conversion temperature of the lithium salt, then the treatment must be carried out so as to prevent loss of the solvent and to attain the requisite temperature.

The nature of the changes which occur when lithium compounds are treated as herein described is not fully known. It may be that the untreated lithium compounds are altered by the treatment to an oriented structure or that a meta stable structure is obtained. It will be understood that these explanations are merely offered as possible theories to describe the profound changes which are observed to occur during the treatment herein described.

The products produced through my treatment with lithium compounds have wide utility and applications. For example, a product of the following composition is useful as a shoe polish:

*Example 4*

|  | Grams |
|---|---|
| Lithium stearate | 13 |
| Paraffin | 10 |
| Turpentine | 77 |

An excellent furniture or auto polish can be made from the following formula:

*Example 5*

|  | Grams |
|---|---|
| Lithium stearate | 15 |
| Paraffin | 10 |
| Kerosene | 75 |

Similarly other very useful products for coating wood, metal, leather, paper, floor covering, textiles, ceramic materials, and similar objects are realized through my invention. A coating for candy comprising chocolate treated by my invention would be useful in overcoming the "hot weather" melting problems now so troublesome to the industry. Coating compositions for protecting objects from corrosive materials are possible through my treatment of lithium compounds.

Coating materials produced by my method of treating have numerous advantages over materials heretofore in use. By proper selection of the lithium compound to be used, coating materials with a very wide range of properties may be produced at will. The blending and mixing of these lithium compounds further extend their great range of flexibility. These lithium salts are synthetic materials and are therefore subject to strict control altogether impossible with natural products. The need for a high melting, water and solvent resistant wax is great and of all the materials heretofore available, only carnauba has proved moderately adequate. My treatment of lithium compounds produces waxes which are superior to carnauba, for the waxes so produced have higher melting points, are more resistant to solvents and to wear. They have the additional advantage of greater uniformity than carnauba since they are produced synthetically and are not subject to natural variations inherent in a vegetable wax.

I claim:

1. A composition comprising a lithium salt of an organic carboxylic acid containing at least eight carbon atoms, and which has been melted and heated below the decomposition temperature thereof, until a substantial reduction in the viscosity of the melted composition has occurred.

2. A composition comprising a lithium salt of an organic carboxylic acid containing at least eight carbon atoms and a wax, and which has been melted and heated below the decomposition temperature thereof, until a substantial reduction in the viscosity of the melted composition has occurred.

3. A composition comprising a lithium salt of an organic carboxylic acid containing at least eight carbon atoms and a solvent compatible with said lithium salt, and which has been melted and heated below the decomposition temperature thereof under conditions retaining substantially all of the solvent in the finished product, until a substantial reduction in the viscosity of the melted composition has occurred.

4. A composition comprising a lithium salt of an organic carboxylic acid containing at least eight carbon atoms, a wax and a solvent compatible with said lithium salt and said wax, and which has been melted and heated below the decomposition temperature thereof under conditions retaining substantially all of the solvent in the finished product, until a substantial reduction in the viscosity of the melted composition has occurred.

5. A composition comprising a lithium salt of a fatty acid containing at least eight carbon atoms, and which has been melted and heated below the decomposition temperature thereof, until a substantial reduction in the viscosity of the melted composition has occurred.

6. A composition comprising a lithium salt of a fatty acid containing at least eight carbon atoms and a wax, and which has been melted and heated below the decomposition temperature thereof, until a substantial reduction in the viscosity of the melted composition has occurred.

7. A composition comprising a lithium salt of a fatty acid containing at least eight carbon atoms and an organic solvent compatible with said lithium salt, which has been melted and heated below the decomposition temperature thereof under conditions retaining substantially all of the solvent in the finished product, until a substantial reduction in the viscosity of the melted composition has occurred.

8. A composition comprising a lithium salt of a fatty acid containing at least eight carbon atoms, a wax and an organic solvent compatible with said lithium salt and wax, and which has been melted and heated below the decomposition temperature thereof under conditions retaining substantially all of the solvent in the finished product, until a substantial reduction in the viscosity of the melted composition has occurred.

9. A composition comprising lithium stearate and a wax, and which has been melted and heated below the decomposition temperature thereof, until a substantial reduction in the viscosity of the melted composition has occurred.

10. A composition comprising lithium stearate and an organic solvent compatible with said lithium stearate, and which has been melted and heated below the decomposition temperature thereof under conditions retaining substantially all of the solvent in the finished product, until a substantial reduction in the viscosity of the melted composition has occurred.

11. A composition comprising lithium stearate, a wax and an organic solvent compatible with said lithium stearate and said wax, and which has been melted and heated below the decomposition temperature thereof under conditions retaining substantially all of the solvent in the finished product, until a substantial reduction in the viscosity of the melted composition has occurred.

12. A process for producing a composition which comprises heat treating below the decomposition temperature, until fusion and substantial lowering of viscosity is achieved, a lithium salt of an organic carboxylic acid containing at least eight carbon atoms.

13. A process for producing a composition which comprises heat treating below the decomposition temperature, until fusion and substantial lowering of viscosity is achieved, a lithium salt of an organic carboxylic acid containing at least eight carbon atoms and an organic solvent compatible with said lithium salt, said heat-treating step being conducted under conditions retaining substantially all of the solvent in the finished product.

14. A process for producing a composition which comprises heat treating below the decomposition temperature, until fusion and substantial lowering of viscosity is achieved, a lithium salt of an organic carboxylic acid containing at least eight carbon atoms, a wax and an organic solvent compatible with said lithium salt and said wax, said heat-treating step being conducted under conditions retaining substantially all of the solvent in the finished product.

15. A composition comprising a blend of a relatively large amount of wax and a relatively small amount of a lithium soap, said composition being prepared by heating said mixture of wax and soap to a temperature above 400° F.

16. A process for producing a composition which comprises heat treating below the decomposition temperature, until fusion and substantial lowering of viscosity is achieved, a lithium salt of an organic carboxylic acid containing at least eight carbon atoms and a wax.

17. A composition comprising a blend of a relatively large amount of wax and a relatively small amount of lithium stearate, said composition being prepared by heating said mixture of wax and lithium stearate to a temperature above 400° F.

18. A method for the treatment of wax to increase its melting point which comprises mixing a relatively large amount of wax and a relatively small amount of a lithium soap at a temperature above 400° F. until said soap is completely dissolved in said wax.

W. F. LUCKENBACH, JR.